(12) United States Patent
Rollinger (10) Patent No.: US 8,959,910 B2
(45) Date of Patent: Feb. 24, 2015

(54) METHOD AND SYSTEM FOR DETERMINING CONDITIONS OF AN AIR FILTER

(75) Inventor: John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 13/162,490

(22) Filed: Jun. 16, 2011

(65) Prior Publication Data

US 2012/0317974 A1 Dec. 20, 2012

(51) Int. Cl.
*F02D 23/00* (2006.01)
*F02M 35/09* (2006.01)
*F02D 41/22* (2006.01)
*F02D 23/02* (2006.01)
*F02D 41/00* (2006.01)
*F02B 37/18* (2006.01)
*F02M 35/10* (2006.01)
*F02B 23/10* (2006.01)
*F02B 75/12* (2006.01)

(52) U.S. Cl.
CPC ............... *F02M 35/09* (2013.01); *Y02T 10/40* (2013.01); *Y02T 10/144* (2013.01); *F02D 41/22* (2013.01); *F02D 2200/04* (2013.01); *F02M 35/10229* (2013.01); *F02B 23/104* (2013.01); *F02D 23/02* (2013.01); *F02D 41/0007* (2013.01); *F02B 2075/125* (2013.01); *F02B 37/18* (2013.01)
USPC .......................................... 60/602

(58) Field of Classification Search
USPC ........... 60/602; 73/118.1, 38, 118.2; 123/494, 123/681, 690, 479, 489, 478
See application file for complete search history.

(56) References Cited

U.S. PATENT DOCUMENTS

| | | | | |
|---|---|---|---|---|
| 3,611,711 A | * | 10/1971 | Milton | 60/600 |
| 4,047,510 A | * | 9/1977 | Nakajima et al. | 123/568.29 |
| 4,574,748 A | * | 3/1986 | Inoue et al. | 123/184.53 |
| 4,642,991 A | * | 2/1987 | Kawabata | 60/602 |
| 4,926,636 A | * | 5/1990 | Tadokoro et al. | 60/312 |
| 5,495,749 A | * | 3/1996 | Dawson et al. | 73/49.7 |
| 5,635,630 A | * | 6/1997 | Dawson et al. | 73/40.5 R |
| 5,676,101 A | | 10/1997 | Kawai et al. | |

(Continued)

FOREIGN PATENT DOCUMENTS

| | | |
|---|---|---|
| EP | 0899737 A2 | 8/1998 |
| EP | 0990793 A3 | 9/2000 |

(Continued)

OTHER PUBLICATIONS

Rollinger, John E., "Method and System for Diagnosing a Vacuum System," U.S. Appl. No. 13/162,481, filed Jun. 16, 2011, 36 pages.

(Continued)

*Primary Examiner* — Kenneth Bomberg
*Assistant Examiner* — Shafiq Mian
(74) *Attorney, Agent, or Firm* — Julia Voutyras; Alleman Hall McCoy Russell & Tuttle LLP (57) ABSTRACT

A method for operating a turbocharger wastegate is disclosed. In one example, the wastegate is operated to provide a state of an engine air intake system air filter. The approach can provide a status the air intake filter via a sensor that has an alternative primary purpose thereby potentially reducing system cost.

19 Claims, 3 Drawing Sheets

(56) References Cited

U.S. PATENT DOCUMENTS

| | | |
|---|---|---|
| 5,755,101 A | 5/1998 | Free et al. |
| 6,012,289 A | 1/2000 | Deckard et al. |
| 6,120,414 A | 9/2000 | Endo et al. |
| 6,192,867 B1 | 2/2001 | Deckard et al. |
| 6,334,834 B1 | 1/2002 | Mizutani et al. |
| 6,735,942 B2 | 5/2004 | Wild et al. |
| 6,745,568 B1 * | 6/2004 | Squires ................. 60/605.3 |
| 6,754,579 B2 | 6/2004 | Kamiya et al. |
| 6,810,667 B2 * | 11/2004 | Jung et al. ................. 60/611 |
| 6,857,415 B2 * | 2/2005 | Kayama et al. .............. 123/349 |
| 6,871,918 B2 | 3/2005 | Wild et al. |
| 6,886,335 B2 | 5/2005 | Tabata et al. |
| 7,082,869 B2 | 8/2006 | Borsch |
| 7,216,479 B2 * | 5/2007 | Tamura .................... 60/285 |
| 7,350,495 B2 * | 4/2008 | Harada .................. 123/184.24 |
| 2009/0107140 A1 * | 4/2009 | Pursifull ................... 60/600 |
| 2010/0036566 A1 | 2/2010 | Hayami |
| 2010/0222980 A1 | 9/2010 | Berr |
| 2011/0088389 A1 * | 4/2011 | Panciroli et al. ............... 60/602 |
| 2011/0197580 A1 * | 8/2011 | Andrasko et al. ............. 60/602 |

FOREIGN PATENT DOCUMENTS

| | | |
|---|---|---|
| EP | 1491748 A2 | 12/2004 |
| EP | 1609970 A2 | 12/2005 |

OTHER PUBLICATIONS

Cunningham, Ralph W. et al., "Method and System for Determining Vacuum Leaks," U.S. Appl. No. 13/162,499, filed Jun. 16, 2011, 35 pages.

Pursifull, Ross D., "Method and System for Prioritizing Vehicle Vacuum," U.S. Appl. No. 13/050,700, filed Mar. 17, 2011, 40 pages.

Pursifull, Ross Dykstra et al., "Method and System for Brake Control," U.S. Appl. No. 13/290,873, filed Nov. 7, 2011, 27 pages.

White, Stephen Michael et al., "Engine Throttle Control with Brake Booster," U.S. Appl. No. 13/287,718, filed Nov. 2, 2011, 29 pages.

* cited by examiner

METHOD AND SYSTEM FOR DETERMINING CONDITIONS OF AN AIR FILTER

BACKGROUND/SUMMARY

Air filters positioned within or as part of an air intake system for an engine provide filtered air for the engine. Air filters can extract dust, dirt, and other air borne materials from an engine's air intake system so that air borne material does not collect in the engine and degrade engine performance and operation. However, air borne material can collect within the air filter over time such that the air filter restricts air flow into the engine. The air flow restriction from the air filter can increase engine pumping work and reduce vehicle fuel economy.

The inventor herein has recognized the above-mentioned disadvantages and has developed a method for assessing an air intake filter, comprising: adjusting a electric vacuum regulator to provide a motive force to a vacuum operated wastegate actuator that positions a turbocharger wastegate; and providing a status of an engine air intake filter in response to a state of a reservoir of the vacuum operated wastegate actuator.

By opportunistically adjusting operation of a vacuum operated wastegate electrical vacuum regulator, it may be possible to control conditions in a wastegate actuator reservoir such that the reservoir is exposed to a pressure in an air intake system at a location between an air filter and a turbocharger compressor. The pressure in the wastegate reservoir can be sampled via a wastegate reservoir sensor, and the pressure can be compared to a predetermined pressure that indicates a flow restricted air filter at the present engine air flow level. If the pressure in the wastegate vacuum reservoir is less than the predetermined pressure that indicates a flow restricted air filter, an indication of a restricted air filter can be provided to the vehicle operator. In this way, a sensor having a purpose for adjusting a turbocharger wastegate can also be the basis for determining a state of an air intake filter.

The present description may provide several advantages. Namely, the approach may reduce cost of monitoring an engine air intake filter. Further, the approach can reduce system complexity since fewer sensors may be used to control and diagnose engine operation. Further still, the approach can reduce fuel consumption by notifying an operator of a restricted air filter.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
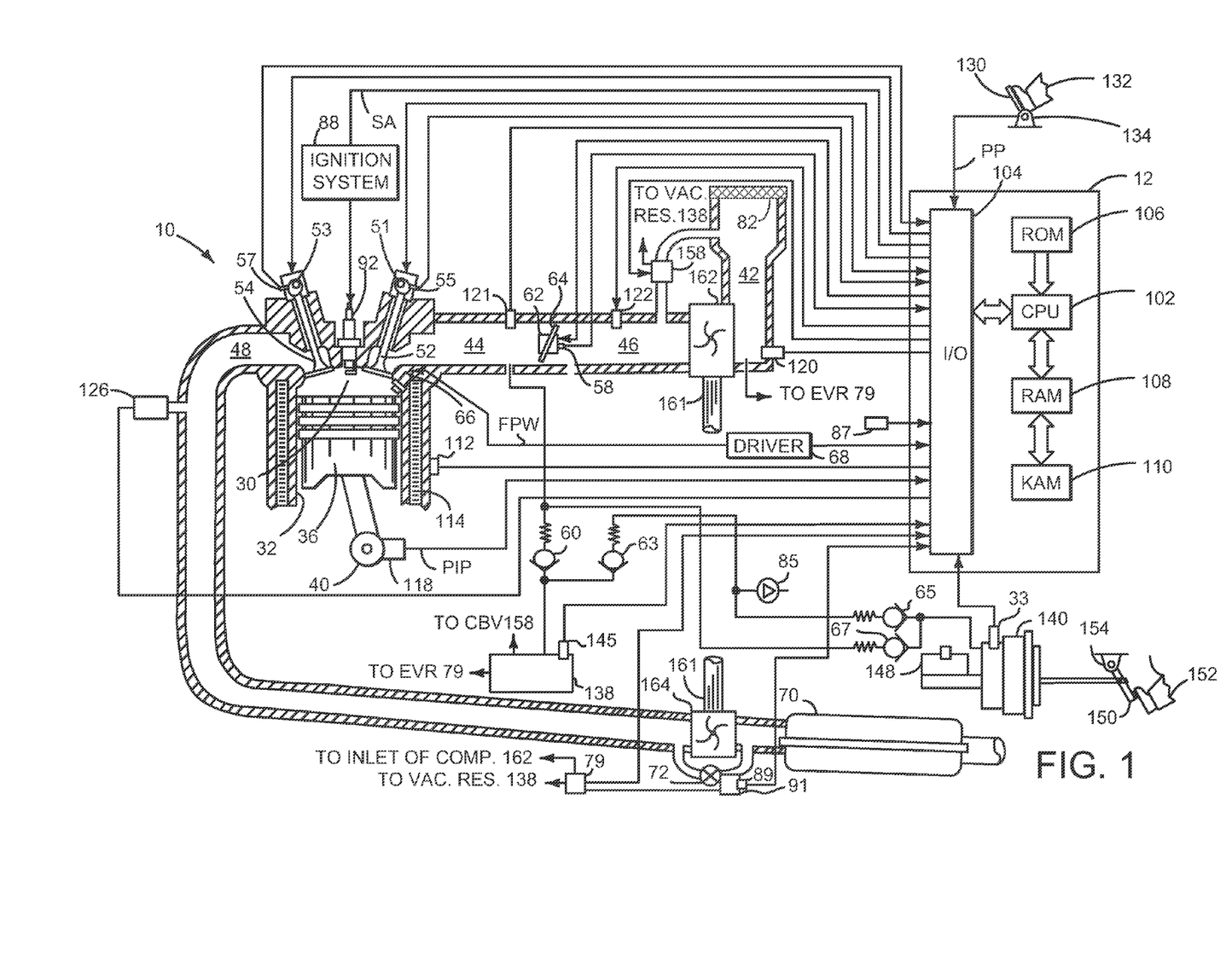
FIG. 1 shows a schematic depiction of an engine and vacuum system.
Figure 2:
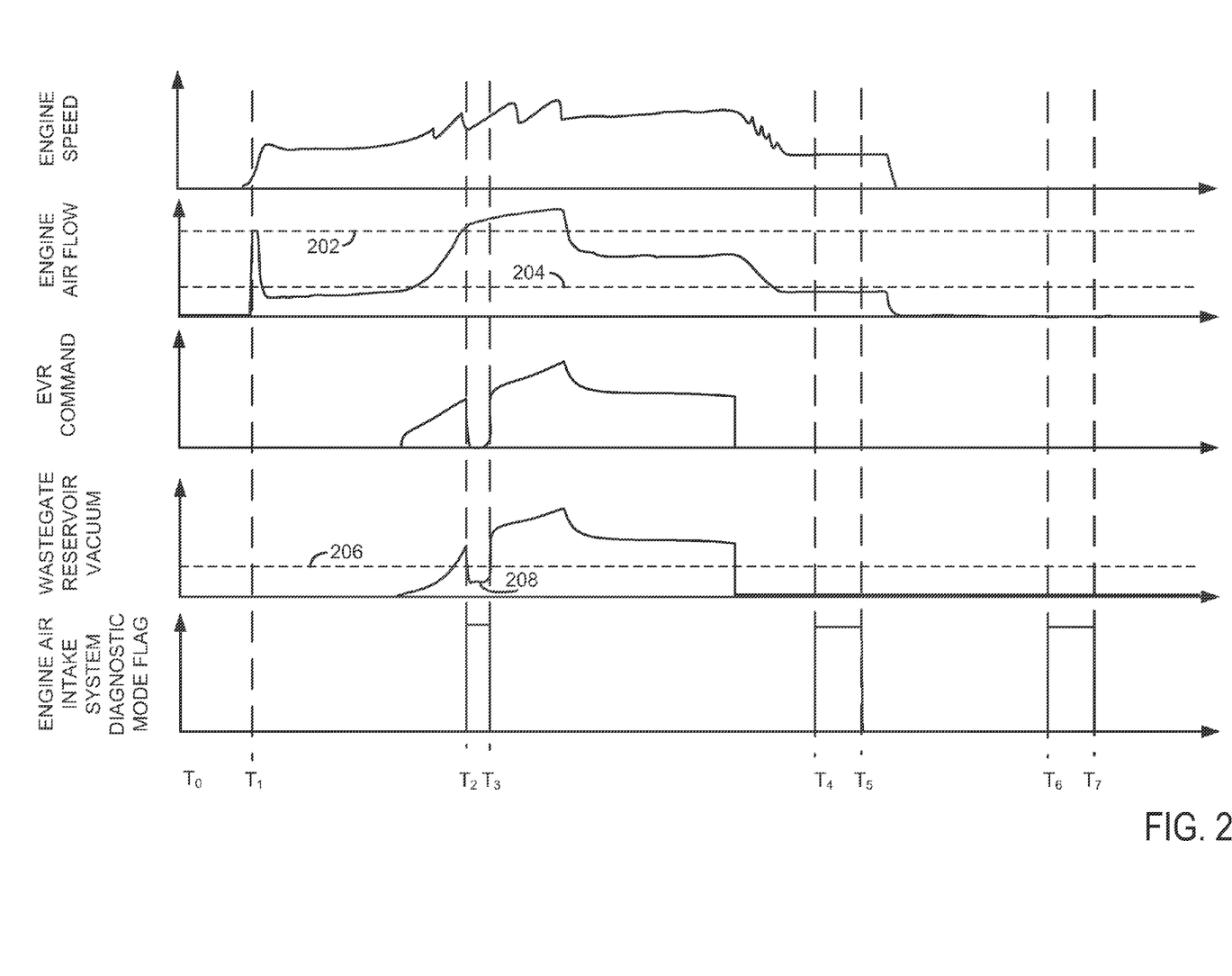
FIG. 2 show simulated signals of interest during engine operation.
Figure 3:
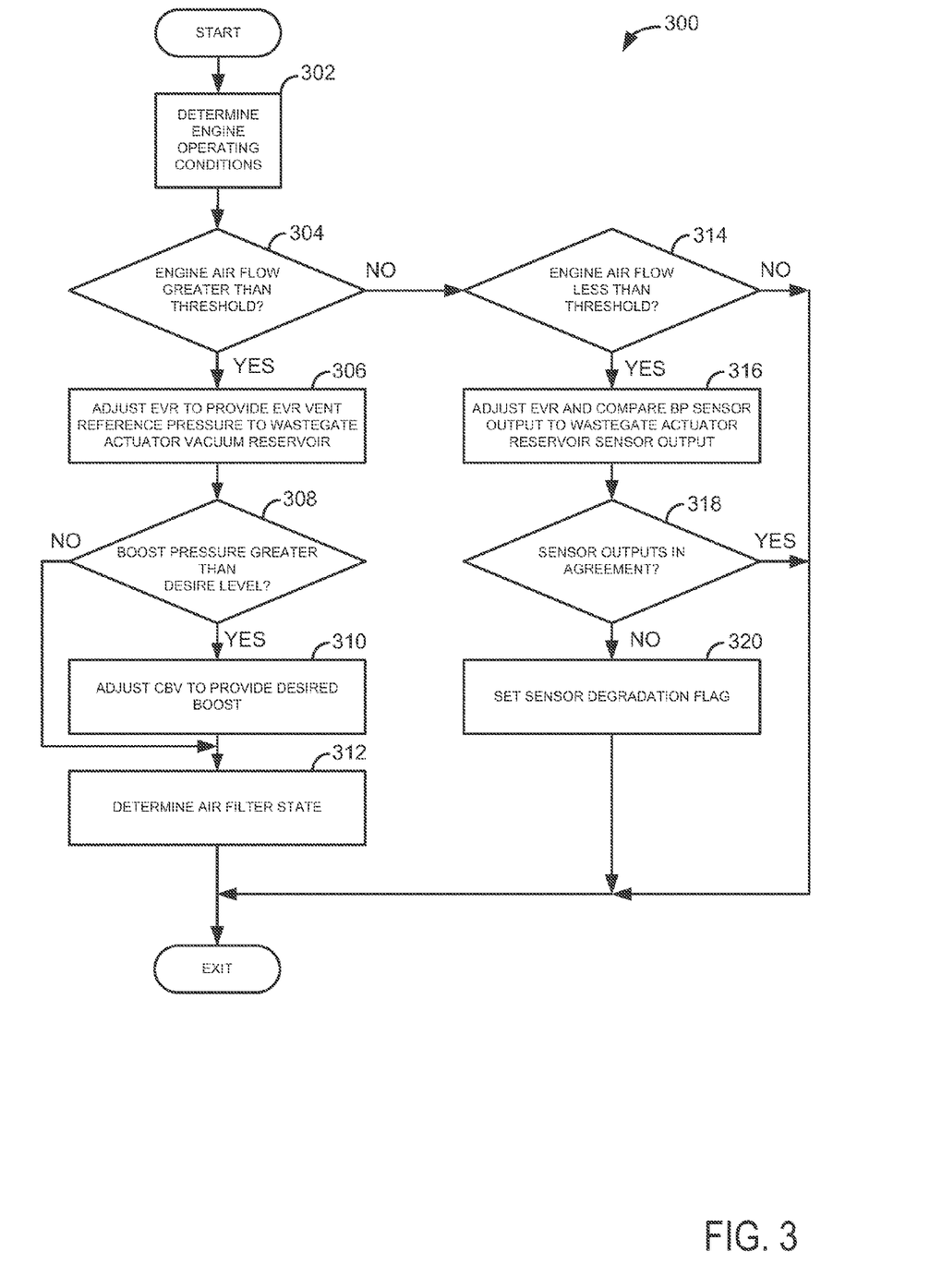
FIG. 3 shows a high level flowchart of a method for assessing a state of an engine air intake filter and engine sensors.

The present description is related to diagnosing a state of an engine air filter. FIG. 1 shows an example engine including a turbocharger and an engine air filter. FIG. 2 shows simulated signals of interest when assessing a state of an engine air intake filter. FIG. 3 shows a high level flowchart for assessing vacuum system degradation.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air through air filter 82 and air intake 42 to supply boost chamber 46. Exhaust gases spin turbine 164 which is coupled to compressor 162 via shaft 161. Vacuum operated waste gate actuator 72 is supplied vacuum via wastegate vacuum reservoir 91 and it allows exhaust gases to bypass turbine 164 so that boost pressure can be controlled under varying engine operating conditions. Compressor bypass valve (CBV) 158 is vacuum operated via vacuum supplied by vacuum reservoir 138. Boost pressure in boost chamber 46 may be reduced when compressor bypass valve 158 is opened since output of compressor 162 is fed back to the input of compressor 162.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine exhaust gases are directed to converter 70. Converter 70 can include multiple catalyst bricks, in one example. In another example, multiple emission control devices, each with multiple bricks, can be used. Converter 70 can be a three-way type catalyst in one example.

Vacuum for the vehicle vacuum system is stored in vacuum reservoir 138. Vacuum reservoir 138 is in pneumatic communication with other vacuum system components via passages as shown. Vacuum may be supplied to vacuum reservoir 138 via intake manifold 44 or vacuum pump 85. Vacuum pump 85 may be electrically driven or mechanically driven via engine 10. Check valve 60 allows air to flow from vacuum reservoir 138 to intake manifold 44 and limits air flow from intake manifold 44 to vacuum reservoir 138. Similarly, check valve 63 allows air to flow from vacuum reservoir 138 to vacuum pump 85 and limits air flow from vacuum pump 85 to vacuum reservoir 138. Brake booster 140 assists operator foot 152 to apply vehicle brakes via master cylinder 148 when brake pedal 150 is depressed. Brake booster may be supplied vacuum via intake manifold 44 or vacuum pump 85 and vacuum reservoir 138. Check valve 65 allows air to flow from brake booster 140 to vacuum pump 85 and vacuum reservoir 138 while it also limits air flow from vacuum reservoir 138 to brake booster 140. Check valve 67 allows air to flow from brake booster 140 to intake manifold 44 while it also limits air flow from intake manifold 44 to brake booster 140. Brake booster 140 may also include an internal vacuum reservoir. Electric vacuum regulator 79 regulates a vacuum level in wastegate vacuum reservoir 91 via a source vacuum supplied from vacuum reservoir 138 and a vent source supplied from air intake 42.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; vacuum reservoir vacuum from vacuum sensor 145; wastegate reservoir vacuum from vacuum sensor 89; brake booster vacuum from vacuum sensor 33; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be measured via sensor 87 for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, prophetic signals of interest during engine operation are shown. The signals of FIG. 2 may be provided by the system of FIG. 1 executing the method of FIG. 3 via instructions of controller 12. Vertical markers $T_0$-$T_7$ are provided to indicate conditions of interest during the sequence.

The first plot from the top of FIG. 2 represents engine speed versus time. The X axis represents time and time increases from the left to right side of the plot. The Y axis represents engine speed and engine speed increases in the direction of the Y axis arrow.

The second plot from the top of FIG. 2 represents engine air flow amount versus time. The X axis represents time and time increases from the left to right side of the plot. The Y axis represents air flowing into an engine and air flow increases in the direction of the Y axis arrow. Horizontal marker line 202 represents a minimum level of engine air flow where assessment of an engine air inlet filter may begin. Horizontal marker line 204 represents a maximum level of engine air flow where assessment of a pressure sensor may begin. The levels or amounts represented by horizontal marker lines 202 and 204 may vary from application to application and are merely provided as an example.

The third plot from the top of FIG. 2 represents an electric vacuum regulator (EVR) command versus time. The X axis represents time and time increases from the left to right side of the plot. The Y axis represents EVR duty cycle and duty cycle increases in the direction of the Y axis arrow. The EVR may be configured as indicated at 79 of FIG. 1, and it may be in pneumatic communication with the vacuum reservoir 91 of vacuum operated wastegate actuator 72 as shown in FIG. 1.

The fourth plot from the top of FIG. 2 represents wastegate reservoir vacuum versus time. The X axis represents time and time increases from the left to right side of the plot. The Y axis represents wastegate reservoir vacuum and vacuum increases in the direction of the Y axis arrow. The vacuum level at the X axis is atmospheric pressure. The wastegate vacuum reservoir may be arranged as indicated at 91 of FIG. 1 and it may hold vacuum to operate vacuum operated wastegate actuator 72 as shown in FIG. 1. Horizontal marker line 206 represents a predetermined vacuum level in the wastegate actuator reservoir where engine air intake filter degradation may be present. A vacuum level that is greater than the level of horizontal line 206 indicates a condition of engine air inlet filter degradation. A vacuum level that is less than the level of horizontal line 206 indicates a condition where engine air inlet filter degradation is not indicated.

The fifth plot from the top of FIG. 2 represents an engine air intake system diagnostic mode flag versus time. The X axis represents time and time increases from the left to the right side of the plot. The Y axis represents engine air intake system diagnostic mode. A value of zero indicates no engine air intake system diagnostic system evaluation is presently being performed. A value of one indicates that an engine air intake system diagnostic system evaluation is presently being performed.

At time $T_0$, the engine is stopped and no engine air intake system diagnostic is being performed. Further, the engine air flow is zero since the engine is stopped and the turbocharger wastegate reservoir is at atmospheric pressure. The EVR is not being supplied a control signal.

At time $T_1$, the engine is started. The engine air flow starts at a high level and decreases as air is pumped from the engine intake manifold. The engine speed accelerates and then settles at a cold start idle speed. In this example, the wastegate is normally closed so the EVR is not commanded to open at engine start. In particular, the EVR duty cycle is at zero during start. However, in other examples, the EVR may be commanded with a higher duty cycle at start. For example, the EVR may be commanded with a 25% duty cycle when the wastegate does not begin to open at less than 30% duty cycle. In this way, the EVR control command may be initially set so that the EVR responds more quickly when the EVR is commanded to open the wastegate. The wastegate reservoir vacuum level is low at engine start indicating that the wastegate remains in the closed position during engine start. Since engine air flow is low during engine idle conditions, the turbocharger compressor flow remains relatively low and boost pressure is low. In some alternative examples, the wastegate may be opened at idle to reduce exhaust backpressure.

Between time $T_1$ and time $T_2$, engine speed and engine air flow increase in response to an increasing engine torque request. The duty cycle of the EVR command is also increased and the wastegate is partially opened to reduce the level of boost provided to the engine via the turbocharger compressor. Increasing the duty cycle of the EVR allows vacuum to increase in the wastegate reservoir. The vacuum operated wastegate actuator opens the wastegate from the normally closed position to a partially open position as vacuum in the wastegate reservoir increases.

At time $T_2$, the engine air flow amount is greater than a threshold level and the air intake system diagnostic is initiated. The engine air intake system diagnostic flag transitions from a lower level to a higher level when the diagnostic is initiated. Further, the EVR duty cycle is decreased so that the output port of the electric vacuum regulator is put in pneumatic communication with a vent port of the electric vacuum regulator at a flow restriction level of less than a predetermined amount (e.g., a flow restriction that results in a pressure drop of less than 20 KPa). Since the vent port of the electric vacuum regulator is in pneumatic communication with the engine air intake system at a location downstream of an air filter and upstream of a turbocharger compressor, the vacuum reservoir of the vacuum operated wastegate actuator is exposed to pressure in the engine air intake system. In some examples, a small pressure difference between the engine air intake system and wastegate vacuum reservoir may exit. If so, the expected pressure difference can be stored in memory and eliminated from the measured pressure by adding or subtracting the pressure difference from the state (e.g., pressure or vacuum) of the wastegate vacuum reservoir.

The EVR duty cycle is shown going to a level of zero to lower the restriction between the EVR vent port and the EVR output port, but in examples where a higher duty cycle provides for a flow restriction level less than a predetermined amount, a higher level EVR duty cycle may be provided when assessing an engine air intake filter. In one example, the EVR duty cycle is adjusted to a maximum duty cycle where the flow restriction from the EVR vent port to the EVR outlet port is less that a predetermined amount. The pressure within the wastegate actuator reservoir may be measured via a pressure or vacuum sensor and compared against a pressure or vacuum level stored in a table containing empirically determined pressure of vacuum levels. The table is indexed using the engine air flow rate and a reference pressure or vacuum level is output. The measured wastegate actuator reservoir pressure or vacuum is compared to the value from the table, and if the measured pressure is less than a pressure from the table, an indication of a degraded engine air intake filter is provided. Alternatively, if a vacuum level of the wastegate actuator reservoir is higher than a vacuum level extracted from the table, an indication of a degraded engine air intake filter is provided. The vacuum or pressure measured in the wastegate actuator reservoir may be averaged over a period of time if desired.

In some examples, where adjusting the EVR duty cycle raises pressure in the air intake system higher than a desired level, a CBV may be partially opened to control the boost pressure to the desired level. Further, the CBV may be adjusted in conjunction with adjustments of the EVR duty cycle so that the boost pressure substantially matches a desired boost pressure during adjustment of the EVR duty cycle. Further still, the CBV may be adjusted based on boost pressure.

At 208, the wastegate actuator reservoir pressure is shown at a level above the X axis where the X axis represents atmospheric pressure. Further, the wastegate actuator reservoir pressure is shown at a level less than the horizontal marker line 206. Thus, pressure in the engine air intake system is slightly less than atmospheric pressure but not to a level where engine air inlet filter degradation is indicated. Therefore, engine air filter degradation is not indicated.

At time $T_3$, the engine air intake system diagnostic is discontinued as indicated by the engine air intake system diagnostic flag transitioning from a higher level to a lower level. The EGR duty cycle is increased so as to increase a level of vacuum in the wastegate actuator reservoir and thereby adjust a position of the wastegate to a desired position based on engine speed and load.

Between time $T_3$ and time $T_4$, engine speed and engine air flow vary according to driver demand. The EVR command also changes with driver demand and engine operating conditions so that a desired level of boost is provided to the engine via the turbocharger. Shortly before time $T_4$, the engine torque request is reduced and engine speed and engine air amount decrease. The engine speed stabilizes at a warm engine idle speed that is lower than the cold engine idle speed.

At time $T_4$, the engine air amount is less than horizontal marker 204 and assessment of a pressure sensor begins. Assessment of sensor operation begins when the engine air intake system diagnostic mode flag transitions from a lower level to a higher level. Shortly thereafter, the EVR duty cycle is commanded so that a restriction between the EVR vent port and the EVR output port is less than a predetermined amount (e.g., a flow restriction that results in a pressure drop of less than 20 KPa) By commanding the EVR to reduce the restriction between the vent port and the output port, the wastegate actuator reservoir is pneumatically coupled to the engine air intake system upstream of the turbocharger compressor so that pressure in the wastegate actuator reservoir is substantially barometric pressure during low engine air flow conditions. The pressure in the wastegate actuator reservoir is allowed to stabilize, and after a short delay corresponding to the restriction of a pneumatic flow path between the EVR and the engine air intake system, a pressure of vacuum level in the wastegate actuator reservoir is measured via a pressure or vacuum sensor. In one example, the output of a barometric pressure sensor (e.g. element 87 of FIG. 1) is compared to the output of a sensor (e.g., element 89 of FIG. 1) exposed to the contents of the wastegate actuator reservoir. If the output of the barometric pressure sensor disagrees with an output of a wastegate actuator reservoir sensor by more than a predetermined amount, an indication of sensor degradation may be provided.

At time $T_5$, the diagnostic for pressure sensor degradation is ceased. Since the EVR command is already at a duty cycle that provides for a low restriction pneumatic communication between the EVR vacuum port and the EVR outlet port, the EVR duty cycle is not adjusted. However, for systems where the wastegate is normally open or where the EVR duty cycle inlet port relationship is different, the EVR duty cycle may be adjusted. If it is determined that the output of a barometric pressure sensor does not agree with the sensor exposed to the interior of the wastegate actuator reservoir, an indication may be provided to the vehicle operator via setting a engine air intake degradation flag.

Between time $T_5$ and time $T_6$, the engine is stopped. The engine is stopped for a predetermined period of time before time $T_6$ is reached. In one example, the predetermined period of time is based on engine operating conditions and ambient temperature. For example, the engine may be allowed to cool for an amount of time that allows convective engine cooling to abate.

At time $T_6$, the pressure sensor diagnostic is reactivated. The pressure sensor diagnostic may be performed during engine stop conditions so that air flow into the engine has less affect on the pressure sensor reading in the wastegate actuator reservoir. In this example, the pressure in the wastegate actuator reservoir goes to atmospheric pressure via the EVR vent port. Consequently, the EVR duty cycle does not have to be increased. However, in examples where the wastegate actuator reservoir holds a vacuum, the EVR duty cycle may be commanded to a value that allows for low restriction pneumatic communication between the EVR vent port and the EVR output port.

At time $T_7$, the pressure diagnostic is deactivated. The pressure diagnostic may be deactivated after the barometric pressure sensor and the wastegate actuator reservoir sensor have been sampled and averaged over a predetermined period of time. The engine remains off after time $T_7$ and diagnostics are suspended.

Referring now to FIG. 3, a flowchart of a method for assessing a state of an engine air intake filer and engine sensors is shown. The method of FIG. 3 may be executed via controller instructions in a system as shown in FIG. 1. Further, the method of FIG. 3 may also provide the sequence and signals of FIG. 2.

At 302, method 300 determines engine operating conditions. Engine operating conditions may include but are not limited to engine speed, engine load, engine air flow amount, ambient temperature, and barometric pressure. Method 300 proceeds to 304 after engine operating conditions are determined.

At 304, method 300 judges whether or not the engine air flow amount is greater than a threshold amount. The threshold amount may vary depending on engine operating conditions. For example, during cold engine operation the engine air flow amount threshold may be increased so that there is less possibility of performing an engine air inlet filter diagnostic. At higher engine temperatures, the engine air flow amount threshold may be decreased to provide for more frequent engine air inlet filter diagnostics. In addition, in some examples, the engine air inlet filter diagnostic may be initiated only after a predetermine number of miles have been put on the vehicle since the prior engine air inlet filter diagnostic. Further still, in other examples, method 300 may proceed to 306 only during select engine operating conditions where the engine speed and load call for a low pneumatic restriction between the EVR vent port and the EVR outlet port. In this way, the engine air inlet filter diagnostic may be opportunistically initiated so as to limit interference with engine operation. If the engine air flow amount is greater than a threshold amount, method 300 proceeds to 306. Otherwise, method 300 proceeds to 314.

At 306, method 300 adjusts a command (e.g., duty cycle, voltage, or current) to the EVR to provide low resistance pneumatic communication between the EVR vent port and the EVR output port. Since the EVR vent port is in pneumatic communication with the engine air intake at a location between the engine air inlet filter and the turbocharger compressor, the wastegate actuator reservoir goes to the same pressure as the engine air intake system between the air filter and the compressor inlet. Method 300 proceeds to 308 after the EVR command change is initiated.

At 308, method 300 judges whether or not the adjustment of the EVR duty cycle will increase the boost pressure above a desired level. In one example, the EVR duty cycle and the present engine speed and engine air amount are used to index a table that contains empirically determined boost amounts. Alternatively, the boost pressure may be monitored via a sensor to determine if boost pressure is greater than a desired boost pressure. If the boost pressure is greater than a desired boost level, or if the expected boost pressure is greater than a desired level, method 300 proceeds to 310. Otherwise method 300 proceeds to 312.

At 310, method 300 adjusts the position of a CBV to regulate the engine boost pressure. In one example, a duty cycle of the CBV is adjusted so as to allow air flow at the outlet of the turbocharger compressor to be routed to the turbocharger compressor inlet. The CBV may be adjusted based on boost pressure sensor feedback or based on EVR position. In systems that have a CBV that simply opens or closes, the CBV may be held in a closed position and the engine air inlet filter state may only be diagnosed during opportunistic conditions where engine air flow is high and the EVR is in a low restriction state between the vent inlet port and the outlet port. Method 300 proceeds to 312 after the CBV position is adjusted.

At 312, method 300 determines the state of the engine air inlet filter. In one example, the pressure or vacuum measured in the wastegate actuator reservoir is compared to a predetermined pressure or vacuum that is based on the engine air amount. In particular, a table holding empirically determined pressures or vacuum levels is indexed via the engine air amount. If the pressure in the wastegate actuator reservoir is less than the pressure extracted from the table, the engine air inlet filter may be diagnosed as degraded. Otherwise, the engine air inlet filter performance may be diagnosed as not degraded to a level less than is desirable. The table may include compensation for barometric pressure and temperature. Method 300 proceeds to exit after the engine air inlet filter is diagnosed.

At 314, method 300 judges whether engine air flow is less than a threshold level. Further, in some examples, method 300 may require the engine to be stopped to perform a pressure or vacuum sensor diagnostic. If method 300 judges the engine air amount to be less than the threshold level, method 300 proceeds to 316. Otherwise, method 300 exits.

At 316, method 300 adjusts a command (e.g., duty cycle, voltage, or current) to the EVR to provide low resistance pneumatic communication between the EVR vent port and the EVR output port. Since engine air flow is low, pressure in the engine air intake approaches barometric pressure. In some examples, the pressure measured at the wastegate actuator reservoir may be adjusted based on engine air flow to compensate for pressure drop across an engine air filter. The pressure in the wastegate actuator reservoir is sampled via the wastegate reservoir sensor and compared to the output of a barometric pressure sensor. In one example, the output of the wastegate reservoir sensor is subtracted from the output of the barometric pressure sensor. Method 300 proceeds to 218 after the output of the barometric sensor is compared to the output of the wastegate actuator reservoir sensor.

At 318, method 300 judges whether or not the sensor outputs are in agreement. In one example, if the difference between the sensors outputs is less than a predetermined amount it may be determined that the sensor outputs are in agreement. If the sensors outputs are in agreement, method 300 proceeds to exit. Otherwise, method 300 proceeds to 320.

At 320, method 300 sets a sensor degradation flag. The degradation flag indicates that either the barometric pressure sensor or the wastegate actuator reservoir sensor may be degraded. In some examples, degradation of the wastegate actuator reservoir sensor may be distinguished from degradation of the barometric pressure sensor by comparing the amount of boost pressure developed at a particular engine speed and load to the pressure or vacuum output from the wastegate actuator reservoir sensor. Since the output of the wastegate actuator reservoir sensor may be indicative of wastegate position, it may be determined if the pressure or vacuum output via the wastegate actuator reservoir sensor is indicative of the wastegate position. Method 300 proceeds to exit after the sensor diagnostic is set to indicate sensor degradation.

It should be noted that vacuum and vacuum sensors are mentioned throughout the description. However, pressure sensors may be substituted for vacuum sensors and similar operations may be performed to detect vacuum system degradation. Further, the wastegate described herein is a normally closed wastegate. However, in alternative examples, the wastegate may be normally open. As such, a particular wastegate configuration described herein is not intended to limit the scope or breadth of the disclosure.

As will be appreciated by one of ordinary skill in the art, the methods described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for assessing an engine air intake filter, the engine including a turbocharger having a wastegate and an electronic engine controller, the method comprising:
   providing a motive force from a vacuum reservoir;
   applying the motive force by adjusting an electric vacuum regulator;
   actuating a vacuum operated wastegate actuator with the motive force, the vacuum operated wastegate actuator being coupled to the turbocharger wastegate;
   repositioning the turbocharger wastegate via the coupled wastegate actuator;
   assessing a status of the engine intake air intake filter, with the electronic engine controller, in response to a state of a reservoir of the vacuum operated wastegate actuator; and
   providing an operator notification of the status of the air intake filter being degraded.

2. The method of claim 1, where the motive force is a vacuum or pressure, and where the state of the reservoir is a pressure or vacuum level.

3. The method of claim 2, where the electric vacuum regulator is adjusted to provide a pressure at a vent port of the electric vacuum regulator to an outlet port of the electric vacuum regulator.

4. The method of claim 3, where the pressure is a pressure in an engine air intake system.

5. The method of claim 1, where the notification of degradation of engine air intake filter is based on a ratio of barometric pressure to the vacuum operated wastegate actuator vacuum reservoir pressure or a difference between barometric pressure and the vacuum operated wastegate actuator vacuum reservoir pressure.

6. The method of claim 1, where the notification of degradation of the air intake filter is provided in response to an air flow rate into the engine that is greater than a predetermined amount.

7. A method for assessing an engine intake air intake filter, the engine including a turbocharger having a wastegate and an electronic engine controller, the method comprising:
   providing a motive force from a vacuum reservoir;
   applying the vacuum motive force by adjusting an electric vacuum regulator;
   actuating a vacuum operated wastegate actuator with the motive force, the vacuum operated wastegate actuator being coupled to the turbocharger wastegate;
   repositioning the turbocharger wastegate via the coupled wastegate actuator;
   assessing a status of the engine air intake filter, with the electronic engine controller, in response to a state of the vacuum reservoir;
   providing an operator notification of the status of the air intake filter being degraded during a first condition of the vacuum reservoir;
   assessing a pressure sensor coupled to the engine in response to the state of the vacuum reservoir of the vacuum operated wastegate actuator during a second condition;
   providing another operator notification of degradation of the pressure sensor.

8. The method of claim 7, where the first condition is an engine air amount greater than a threshold level, where the state of the vacuum reservoir is a vacuum or pressure level, and where the motive force is a pressure or vacuum.

9. The method of claim 7, where the second condition is an engine air amount less than a threshold level.

10. The method of claim 7, where the another notification of degradation of the pressure sensor is a wastegate vacuum reservoir pressure sensor or a barometric pressure sensor.

11. The method of claim 7, where adjusting the electrical vacuum regulator includes commanding a vacuum level at an outlet port of the electrical vacuum regulator and in the vacuum reservoir of the vacuum operated wastegate actuator via a duty cycle supplied to the electrical vacuum regulator.

12. The method of claim 11, where the duty cycle is adjusted to provide a pressure at a vent port of the electrical vacuum regulator to an outlet port of the electrical vacuum regulator, and where the vent port is in pneumatic communication with an engine air intake system.

13. The method of claim 7, where degradation of the pressure sensor is based on a comparison of an output of a first sensor to an output of a second sensor.

14. A system for assessing an air intake filter, comprising:
an engine including an air intake system and an exhaust system;
a turbocharger coupled to the engine and including a compressor in the air intake system and a turbine in the exhaust system;
an air filter within the air intake system;
a vacuum operated wastegate actuator coupled to the turbocharger;
an electric vacuum regulator in pneumatic communication with the air intake system, a vacuum reservoir of the vacuum operated wastegate actuator, and a vacuum supply; and
a controller, the controller including non-transitory memory, the controller further including instructions stored in the non-transitory memory to provide a status of the air filter in response to a state of the vacuum reservoir of the vacuum operated wastegate actuator.

15. The system of claim 14, where the state of the vacuum reservoir of the vacuum operated wastegate actuator is a pressure or vacuum, and where the controller includes further instructions for determining sensor degradation in response to the state of the vacuum reservoir of the vacuum operated wastegate actuator.

16. The system of claim 14, where the electric vacuum regulator is in pneumatic communication with the air intake system at a position between the air filter and an inlet of the compressor.

17. The system of claim 14, where the vacuum supply includes an intake manifold and a vacuum pump.

18. The system of claim 14, further comprising additional controller instructions for at least partially opening a compressor bypass valve in response to a request to assess a state of the air filter.

19. The system of claim 18, further comprising additional controller instructions for assessing the state of the air filter when an engine air flow amount is greater than a threshold amount.

* * * * *